United States Patent [19]

Rosen et al.

[11] 4,363,891
[45] Dec. 14, 1982

[54] GLYCERYL MONOSTEARATE PLASTIC LUBRICANTS

[75] Inventors: Marvin Rosen, Williamsport; Larry K. Hall, Cogan Station, both of Pa.

[73] Assignee: Glyco Inc., Williamsport, Pa.

[21] Appl. No.: 263,733

[22] Filed: May 14, 1981

[51] Int. Cl.³ .............................................. C08K 5/10
[52] U.S. Cl. ................... 524/317; 524/318; 524/565; 524/567; 524/569; 524/583
[58] Field of Search ............. 260/23 XA, 23 H, 23 S; 524/317, 318, 567, 569, 565, 583

[56] References Cited

U.S. PATENT DOCUMENTS 4,097,433  6/1978  Kane ............................. 260/23 XA
4,169,083  9/1979  Vassiliou ........................ 260/23 XA
4,269,744  5/1981  Hulyalkar et al. ............ 260/23 XA
4,274,988  6/1981  Snel ................................ 260/23 XA
4,283,310  8/1981  James et al. ................... 260/23 XA

OTHER PUBLICATIONS

Warth, The Chemistry and Technology of Waxes, 2nd Edition, Reinhold Publishing Corp., N.Y., N.Y., 1956, pp. 534–538.

*Primary Examiner*—Ronald W. Griffin
*Attorney, Agent, or Firm*—Cushman, Darby & Cushman

[57] ABSTRACT

Substantial improvement in the heat stability of rigid plastic products, such as polyvinyl chloride, is obtained by incorporating therein glyceryl monostearate having less than 4% contained glycerine.

10 Claims, No Drawings

GLYCERYL MONOSTEARATE PLASTIC LUBRICANTS

BACKGROUND OF THE INVENTION

Lubricants are conventionally employed in the processing of rigid plastic materials such as polyvinylchloride, acrylonitrile-butadiene-styrene and polypropylene polymers to improve the process-ability of the polymer. These provide for internal dynamic lubrication for the polymer molecules by reducing the interactive force between polymer chains.

The addition of lubricants to rigid plastic materials generally does not enhance the early color and heat stability of the material. Glyceryl monostearates (GMS) have been used as lubricants in polyvinylchloride and have been observed to produce some enhanced heat stability. We have found, however, that if the glycerine content of GMS is appropriately limited, an unexpected degree of heat stability and enhanced early color results in the use of GMS as a lubricant.

Accordingly, it is the primary object of the present invention to provide an improved method for lubricating rigid plastic materials with enhanced heat stability using a GMS lubricant.

It is a further object of the present invention to provide enhanced early color in rigid plastic materials using a GMS lubricant.

Still yet a further object of the present invention is to provide rigid plastic materials having enhanced early color and improved heat stability.

These and other objects of the present invention will become more apparent from the following discussion.

DETAILED DESCRIPTION OF THE INVENTION

The present invention provides a method for improving the heat stability and early color of a rigid plastic material which comprises incorporating into the plastic material a glyceryl monostearate lubricant containing 4% or less by weight of glycerine.

Commercial GMS is produced by the glycerolysis of hydrogenated tallow glycerides or by direct esterification of glycerine with fatty acids. Normal processing yields products containing a residuum of 5-10% glycerine. Such products, when used as lubricants, for example in rigid PVC compounds, provide some Brabender heat stability. However, we have found that when the glycerine content is reduced to less than 4%, and preferably below 1%, a substantial and unexpected improvement in heat stability and early color is obtained without affecting the other properties of the plastic system.

While the present method is directed to rigid plastic materials in general, it is particularly suited to polyvinylchloride (PVC), acrylonitrile-butadiene-styrene (ABS) and polypropylene systems, and especially PVC.

The low glycerine GMS is incorporated into the plastic material generally during preparation of the masterbatch and prior to dynamic processing of the material. The amount of GMS used is not critical, but should be sufficient to lubricate the plastic material. Thus, for every 100 parts of plastic resin material, one may suitably use from about 0.1 to about 5 parts of GMS (i.e. 0.1 to 5 phr) containing less than 4% glycerine. Preferably, one would use from about 0.5 to about 2 phr GMS.

The resulting rigid plastic materials can be used in a wide variety of applications, viz., siding and bottle formations.

The following examples are offered in order to more fully illustrate the invention, but are not to be construed as limiting the scope thereof.

EXAMPLE ONE

Preparation of Glyceryl Monostearate Containing Less Than 1 Percent Glycerine

A one liter heated reaction flask fitted with a stirrer and topped with a packed column terminating in an overhead condenser was charged with 0.56 moles of hydrogenated tallow glycerides, 1.30 moles of glycerine, and a catalytic amount of calcium hydroxide. The system was purged with nitrogen and a nitrogen blanket was maintained throughout the reaction and stripping stage. The glycerolysis was conducted at 245° C. and terminated with the addition of phosphoric acid. The glycerine was removed by vacuum distillation. Reaction aliquots were taken periodically for performance studies. When no additional glycerine was observed condensing, the reaction mixture was cooled to 90° C. and bottled. The product contained about 1.5% glycerine.

The glycerine monostearate was washed free of glycerine by dissolving it in about five times its weight of chloroform on a steam bath followed by five water washes, each water wash being about half as much volume as the chloroform layer. The chloroform solution was dried over anhydrous magnesium sulfate and the chloroform was evaporated on a steam bath under a nitrogen sparge. After air drying, the solids were evacuated in a rotary evaporator at 35-40° C./5 minutes. The product contained no glycerine.

EXAMPLE TWO

Screening Formulation

To 100 parts of PVC resin, K value 56, was blended 1.5 phr of a heat stabilizer (T-31 obtained from M & Thermolite Co.) and varying amounts of glyceryl monostearate (GMS) having different amounts of contained glycerine. Fifty-five grams of the mixture was charged to a No. 6 roller head of a Brabender Plasticorder (Model EPL-V302) fitted with roller blades and fused at 187° C. at 70 rpm. Samples were taken periodically, molded into buttons, and examined for heat degradation as evidenced by a change in color from colorless to black. Degradation was also taken as an increase of 100 meter-grams in torque. The results are set forth in Table 1 below.

TABLE 1

| | Screening Formulation | | |
|---|---|---|---|
| Test No. | GMS, phr | Contained Glycerine, % | Stability, Minutes |
| 1 | 0 | — | 24.5 |
| 2 | 2.0 | 1 | 38.3 |
| 3 | 2.0 | 0 | 43.5 |

EXAMPLE THREE

General Rigid Formulation

The conditions of Example Two were repeated using different amounts of glyceryl monostearate containing varying amounts of glycerine per 100 parts of PVC resin, K value 64, 2 phr Thermolite T-31, 2 phr of an acrylic processing aid (Rohm and Haas K-120ND), and 0.2 phr of an esterified montan wax. The results are contained in Table 2.

TABLE 2

General Rigid Formulation

| Test No. | GMS, phr | Contained Glycerine, % | Stability, Minutes |
|---|---|---|---|
| 1 | 0 | — | 25.8 |
| 2 | 2.0 | 1 | 40.8 |
| 3 | 2.0 | 0 | 43.0 |

EXAMPLE FOUR

Bottle Formulation

Again the conditions of Example Two were repeated. In addition to the noted amount of GMS, the formulations contained 100 parts of PVC resin, K value 58, 1.5 phr of Thermolite T-108, 0.2 phr of esterified montan wax, 2 phr of an acrylic processing aid and 12 phr of an acrylic impact modifier (Rohm and Haas KM641). The results are contained in Table 3.

TABLE 3

Bottle Formulation

| Test No. | GMS, phr | Contained Glycerine, % | Stability, Minutes |
|---|---|---|---|
| 1 | 0 | — | 21.0 |
| 2 | 1.5 | 4 | 31.3 |
| 3 | 1.5 | <1 | 35.0 |
| 4(a) | 1.5 | 4 | 30.3 |
| 5 | 1.5 | 7 | 29.8 |
| 6 | 1.5 | 5 | 30.5 |
| 7 | 1.5 | 3 | 33.0 |
| 8 | 1.5 | 1 | 33.8 |
| 9 | 1.5 | <1 | 34.5 |
| 10 | 1.5 | 1 | 35.0 |
| 11(b) | 1.5 | 0 | 42.0 |

Tests 2-4 and 5-9 represent preparations where glycerine was removed by distillation to give GMS with the contained glycerine listed.

(a) Three percent glycerine was added back to the product prepared in Test 3.

(b) Commercial glycerine monostearate used. Product was dissolved in chloroform and washed free of glycerine with water.

EXAMPLE FIVE

Siding Formulation

The conditions of Example Two were repeated using 100 phr of a PVC resin, K value 56, 2 phr of Thermolite T-31, 12 phr of a titanium dioxide pigment, 0.8 phr of calcium stearate, 0.8 phr of a mixed pentaerythritol ester, 2 phr of an acrylic processng aid, and 6 phr of an acrylic impact modifier. Table 4 sets forth the results.

TABLE 4

Siding Formulation

| Test No. | GMS, phr | Contained Glycerine, % | Stability, Minutes |
|---|---|---|---|
| 1 | 0 | — | 35.5 |
| 2 | 1.0 | 1 | 45.3 |
| 3 | 1.0 | 0 | 46.5 |

EXAMPLE SIX

Early Color

When the glycerine content of the GMS lubricant is reduced to less than 4%, a substantial improvement in early color as well as heat stability is obtained without affecting the other properties of the PVC system. In a clear PVC formulation, the onset of color instability is observed at approximately 15 minutes. When the glycerine content of the lubricant is reduced to less than 1%, a lighter colored specimen results. This color improvement continues throughout the remainder of the test run, as shown in the data of Table 5 below. This data is based on the same type formulation as in Example Four above using GMS containing levels of glycerine ranging from 7% to less than 1%.

TABLE 5

Color Stability - Bottle Formulations

| | | | Observed Button Color | | | | |
|---|---|---|---|---|---|---|---|
| Test No. | GMS, phr | Time, Min. | 7% Glycerine | 5% Glycerine | 3% Glycerine | 1% Glycerine | <1% Glycerine |
| 1 | 1.5 | 2 | Colorless | Colorless | Colorless | Colorless | Colorless |
| | | 10 | Colorless | Colorless | Colorless | Colorless | Colorless |
| | | 15 | Yellow | Yellow | Lt. Yellow | Lt. Yellow | V. Lt. Yellow |
| | | 23 | Amber | Amber | Dk. Yellow | Dk. Yellow | Yellow |
| | | 26 | Dk. Brown | Brown | Amber | Amber | Lt. Amber |
| | | 29.75 | Black | — | — | — | — |
| | | 30.5 | — | Black | — | — | — |
| | | 33.0 | — | — | Black | — | — |
| | | 34.5 | — | — | — | Black | — |
| | | 35.5 | — | — | — | — | Black |

From the foregoing, it is obvious that the use of GMS containing less than 4% glycerine provides substantial enhancement to the heat stability of such rigid plastic materials as PVC without adversely affecting the other properties of the material. The invention having been thus described, it will be appreciated that various modifications may be made thereto without departing from the scope thereof. Furthermore, the invention may comprise, consist of or consist essentially of the herein recited materials and steps.

We claim:

1. A method for improving early color and long-term heat stability under dynamic processing conditions of a rigid plastic material selected from the group consisting of polyvinylchloride, acrylonitrile-butadiene-styrene copolymer and polypropylene which comprises adding to said material a glyceryl monostearate lubricant containing less than 4% glycerine.

2. A method according to claim 1 wherein said plastic material is a rigid polyvinylchloride.

3. A method according to claim 1 or 2 wherein the amount of glyceryl monostearate ranges from about 0.1 parts to about 5 parts by weight per hundred parts of said plastic material.

4. A method according to claim 3 wherein the amount of glyceryl monostearate ranges from about 0.5 to about 2 parts.

5. A rigid plastic material having improved early color and enhanced long-term heat stability under dynamic processing conditions comprising a rigid plastic material selected from the group consisting of polyvinylchloride, acrylonitrile-butadiene-styrene copolymer and polypropylene in combination a glyceryl monostearate lubricant containing less than 4% glycerine.

6. A material according to claim 5 wherein said rigid plastic material is polyvinylchloride.

7. A material according to claim 5 or 6 wherein the amount of glyceryl monostearate ranges from about 0.1 parts to about 5 parts by weight per hundred parts of said plastic material.

8. A material according to claim 7 wherein the amount of glyceryl monostearate ranges from about 0.5 to about 2 parts.

9. A method according to claim 1 wherein the glyceryl monostearate lubricant contains less than 1% glycerine.

10. A material according to claim 5 wherein the glyceryl monostearate lubricant contains less than 1% glycerine.

* * * * *